United States Patent Office 2,991,252
Patented July 4, 1961

2,991,252
SYNTHETIC LUBRICANTS
Samuel Richard Pethrick and Maurice Barrington Sparke, both of Sunbury-on-Thames, England, assignors to The British Petroleum Company Limited, London, England, a corporation of Great Britain
No Drawing. Filed Aug. 14, 1958, Ser. No. 754,931
Claims priority, application Great Britain Aug. 16, 1957
10 Claims. (Cl. 252—47.5)

This invention relates to synthetic lubricants.

Synthetic lubricants have previously been proposed consisting of a blend of a liquid aliphatic diester of a saturated aliphatic dicarboxylic acid and a polyester of the general formula:

$$HO(R_2OOCR_1COO)_nR_2OH \qquad I$$

where $R_1$ is the hydrocarbon radical of an aliphatic dicarboxylic acid, $R_2$ is the hydrocarbon radical of a glycol and $n$ is a number from 1–10 (see U.K. patent specification No. 763,077).

We have found now that certain blends of the above type or similar to the above type can be produced that have properties which render them particularly suitable for aero gas turbine lubrication.

According to the invention, a lubricating composition comprises a blend of a liquid aliphatic diester of a saturated aliphatic dicarboxylic acid and a polyester, soluble in the diester, and having the general Formula I above, where:

$n$ is an integer,
the $R_1$'s are alkylene groups having 4–14, preferably 6–10 carbon atoms, and
the $R_2$'s are oxygenated hydrocarbon radicals of the formula:

$$-(CH_2CH_2O)_xCH_2C(R_6)(R_7)CH_2(OCH_2CH_2)_y- \qquad II$$

where:

$x$ is 0 or an integer, $y$ is an integer and $x+y$ does not exceed 5,
$R_6$ is a methyl or ethyl group, preferably a methyl group, and
$R_7$ is an alkyl group having 1–4 carbon atoms, preferably a methyl group, the relative proportions of diester and polyester in the blend being such that the viscosity of the blend at 210° F. is 3–30, preferably 3–10, especially 6–10 centistokes.

The alkyl and alkylene groups may be straight—or branched-chain.

Preferred diesters for use in the blends according to the invention are those of the formula:

$$R_4OOCR_5COOR_4$$

where $R_5$ is an alkylene group having 4–14 carbon atoms and the $R_4$'s are alkyl groups, preferably branch-chain having 4–18 carbon atoms.

Examples of suitable diesters are:

(i) Di(2-ethyl hexyl) sebacate; (di-octyl sebacate)
(ii) Di(3:5:5-trimethylhexyl) sebacate; (di-nonyl sebacate)
(iii) 2-ethylhexyl(3:5:5-trimethylhexyl) sebacate; (octyl nonyl sebacate), and
(iv) Mixtures of (i), (ii) and (iii).

Preferred polyesters are those having a viscosity at 25° C. of 50–20,000 centistokes, especially 500–10,000 centistokes, particularly those in which the $R_1$'s have 7 or 8 carbon atoms, especially octamethylene, 1:1:3-trimethyltetramethylene or 1:3:3-trimethyltetramethylene, and the $R_2$'s are radicals of Formula II in which $x+y=1-2$.

It is to be understood that different $R_1$ groups, different $R_6$ groups, different $R_7$ groups and different values of $x$ and $y$ may be present in any given polyester molecule, that different $R_4$ groups may be present in any given diester molecule and that mixtures of different polyester molecules and/or different diester molecules may be present in the same blend.

Polyesters for use in the lubricant blend according to the invention may be prepared by reacting in one or more stages the following ingredients:

(a) an acid or acids of the formula $HOOCR_1COOH$, and
(b) a diol or diols of the formula $$HO(CH_2CH_2O)_xCH_2C(R_6)(R_7)CH_2(OCH_2CH_2)_yOH \qquad III$$

where $R_1$, $R_6$, $R_7$, $x$ and $y$ have the values given previously, the molecular proportion of diol(s) being greater than, but preferably not more than twice, the molecular proportion of acid(s). Diols of Formula III may be prepared by reacting ethylene oxide with a diol of the formula $$HOCH_2C(R_6)(R_7)CH_2OH$$

the molecular ratio of ethylene oxide to diol not exceeding 5:1 and being preferably 1–2:1. As stated above, mixtures of polyesters of the above formula may be used in the lubricant blend i.e. polyesters having different values of $n$ and having different acid and diol residues. With such a mixture the average value of $n$ would not necessarily of course be a whole number. Thus when preparing a polyester mixture, the molecular proportions of the ingredients to be reacted need not be present in whole number ratios.

Examples of acids which may be used in the preparation of the polyesters are adipic acid, pimelic acid, suberic acid, azeleic acid and brassylic acid.

Particularly satisfactory acids have been found to be:

(a) sebacic acid, and
(b) an equimolecular mixture of 2:2:4-trimethyladipic, 2:4:4-trimethyladipic and sebacic acids.

Particularly satisfactory diols were prepared as follows: 416 gm. (4 mol) of neopentyl glycol (2:2-dimethyl-1:3-propanediol) was heated to 160° C. and a small quantity of zinc chloride (a catalyst) was stirred in. Ethylene oxide was then passed through the hot mixture until 310 gm. (about 7 mol) of ethylene oxide had combined with the neopentyl glycol. The pressure was then reduced to 1 mm. of mercury and the diol product distilling off over the temperature range 60–145° C. was collected. The molecular weight of the diol product (hereinafter called diol D1) was 180 and it consisted mainly of a mixture of diols of Formula III in which $R_6$ and $R_7$ are methyl groups and $x+y$ had an average value of about 1.7.

Some of the diol D1 was further distilled until a diol product (hereinafter called diol D2) was obtained which had the following properties:

Boiling point _____ 132.7° C. at 9.5 mm. Hg.
$n_D^{20}$ _____ 1.4482.
Analysis _____ C, 56.75%; H, 10.7%.

These properties correspond to a formula of $C_7H_{16}O_3$, i.e. a compound of Formula III in which $R_6$ and $R_7$ are both methyl groups, $x=0$ and $y=1$.

Preferably the blend according to the invention is one containing 5–60% by weight of polyester, especially 5–35% the remainder of the blend being substantially diester.

Any antioxidant for lubricants, for example phenothiazine, may be incorporated in the blend if desired.

By way of example, polyesters P121, P122 and P131 were prepared from the ingredients listed in Table 1 below by the following method:

The ingredients were reacted in a three-neck, 500 ml. flask fitted with a stirrer, a nitrogen inlet tube and a vertical steam-heated condenser fitted to a water-cooled, downward facing condenser. Nitrogen was blown through at a rate of approximately 5 liters per hour and the following heating cycle carried out.

The contents of the flask were heated rapidly to 130° C. (all temperatures being measured internally) at which they were kept for four hours. After the reaction had been allowed to continue at each of the temperatures 150°, 180° and 200° C. for two hours, the distillate was collected. The diol content was calculated from a refractive index determination and, after this amount had been added to the flask, heating at 240° C. was carried out until the acid value fell below 5 mg. KOH/g. At this stage the pressure was reduced to 17 mm. of mercury and the reaction was continued at 240° C. until the acid value fell below 1 mg. KOH/g.

Table I gives the composition and properties of polyesters P121, P122 and P131.

*Table I*

| Polyester | Molar Proportions | | | | Viscosity at 25° C. (centistokes) |
|---|---|---|---|---|---|
| | Sebacic Acid | Mixed Acids[1] | Diol D1 | Diol D2 | |
| P121 | 0.5 | | 0.55 | | 2,921 |
| P122 | 1.0 | | | 1.25 | 3,500 |
| P131 | | 1.0 | 1.1 | | 5,000 |

[1] An equimolecular mixture of 2:2:4-trimethyladipic, 2:4:4-trimethyladipic and sebacic acids.

Polyesters P121, P122 and P131 were blended with a diester and phenothiazine to form blends B121, B122 and B131 having the composition and properties shown in Table II. By way of comparison certain properties are also given of a commercially available synthetic aero gas turbine lubricant blend (X) and of a blend (B61) containing a known polyester of Formula I (P61) which consists essentially of a poly-(propylene sebacate) which is available commercially under the trade name "Reoplex 100." The diester was prepared from equimolecular amounts of sebacic acid, 2-ethylhexanol and 3:5:5-trimethylhexanol. In addition to octyl nonyl sebacate, the product also contained di-octyl and di-nonyl sebacates.

B131. Blend X also had poor low temperature properties.

The low temperature properties of blends according to the invention may be further improved if desired by the addition of a crystallisation suppressant e.g. a polymerised alkyl ester of acrylic or methacrylic acid, but it is an advantage when good low temperature properties can be achieved without the addition of such materials since they have an adverse effect on both the thermal stability and shear stability of blends containing them.

The open beaker test referred to in Table II was carried out as follows. 250 ml. of oil are heated in a 400 ml. beaker in an oven maintained at an air temperature of 300° C. Samples of the oil are withdrawn after heating for 2, 3, 4 and 5 hours and the viscosity at 100° F. is measured.

We claim:

1. A lubricating composition consisting essentially of a blend of:

a liquid aliphatic diester of the formula $R_4OOCR_5COOR_4$ where $R_5$ is an alkylene group having 4–14 carbon atoms and $R_4$ is an alkyl group having 4–18 carbon atoms, and 5–60% by weight of the composition of a polyester which is soluble in the diester and has the general formula $$HO(R_2OOCR_1COO)_nR_2OH$$

where:

$n$ is an integer, $R_1$ is an alkylene group having 6–10 carbon atoms, and $R_2$ is an oxygenated hydrocarbon radical of the formula $$-(CH_2CH_2O)_xCH_2C(CH_3)_2CH_2(OCH_2CH_2)_y-$$

where:

$x$ is an integer from 0–4, $y$ is an integer from 1–5 and $x+y$ does not exceed 5, the viscosity of the polyester at 25° C. being 50–20,000 centistokes, the relative proportions of diester and polyester in the blend being such that the viscosity of the blend at 210° F. is 3–10 centistokes.

2. A lubricating composition according to claim 1 including an anti-oxidizing amount of phenothiazine.

3. A lubricating composition consisting essentially of a blend of:

at least one diester selected from the group consisting of di(2-ethylhexyl) sebacate, di(3:5:5-trimethylhexyl) sebacate and 2-ethylhexyl(3:5:5-trimethylhexyl) sebacate, and

*Table II*

| Blend | Ingredients of blends, percent wt. | | | Viscosity at 210° F., centistokes | Viscosity at 100° F., centistokes | Low Temperature Performance | Thermal Stability (open beaker test), Max. change in viscosity at 100° F., percent |
|---|---|---|---|---|---|---|---|
| | Diester | Polyester | Phenothiazine | | | | |
| B121 | 80.41 | 18.59 (P121) | 1.0 | 7.83 | 37.21 | Mobile at −50° C | +14.9 |
| B122 | 80.07 | 16.93 (P122) | 1.0 | 7.9 | 37.12 | Mobile at −60° C | |
| B131 | 80.71 | 18.29 (P131) | 1.0 | 7.76 | 37.82 | Mobile at −54° C | +16.5 |
| B61 | 91.46 | 7.54 (P61) | 1.0 | 6.5 | 28.36 | Immobile at −40° C | −20.2 |
| X | | | | 7.51 | 35.85 | Immobile at −40° C | |

It will be seen that the blends according to the invention (blends B121, B122 and B131) have better thermal stability properties than blend B61. (Good thermal stability is indicated by a low change in viscosity after the high temperature treatment. An increase in viscosity at 100° F. after the high temperature treatment is preferable to a decrease.) Furthermore, blends B121, B122 and B131 have excellent low temperature properties whereas blend B61 gives a poor performance at low temperatures despite the fact that it contains a higher proportion of the less viscous diester component than blends B121 and 5–35% by weight of the composition of a polyester which is soluble in the diester and has the general formula $$HO(R_2OOCR_1COO)_nR_2OH$$

where:

$n$ is an integer, $R_1$ is an alkylene group having 7–8 carbon atoms, and $R_2$ is an oxygenated hydrocarbon radical of the formula $$-(CH_2CH_2O)_xCH_2C(CH_3)_2CH_2(OCH_2CH_2)_y-$$

where:

$x$ is an integer from 0–1, $y$ is an integer from 1–2 and $x+y$ equals 1–2, the viscosity of the polyester at 25° C. being 500–10,000 centistokes, the relative proportions of diester and polyester in the blend being such that the viscosity of the blend at 210° F. is 6–10 centistokes.

4. A lubricating composition according to claim 3 in which the polyester is one in which $R_1$ is a radical selected from the group consisting of octamethylene, 1:1:3-trimethyltetramethylene and 1:3:3-trimethyltetramethylene.

5. A lubricating composition according to claim 3 including about 1% by weight of the composition of phenothiazine.

6. A lubricating composition consisting essentially of:

a liquid aliphatic diester of the formula $R_4OOCR_5COOR_4$ where $R_5$ is an alkylene group having 4–14 carbon atoms and $R_4$ is an alkyl group having 4–18 carbon atoms, and 5–60% by weight of the composition of a polyester which is soluble in the diester and which has been prepared by reacting an acid of the formula $$HOOCR_1COOH$$

where $R_1$ is an alkylene group having 6–10 carbon atoms, with a diol of the formula:

$$HO(CH_2CH_2O)_xCH_2C(CH_3)_2CH_2(OCH_2CH_2)_yOH$$

where:

$x$ is an integer from 0–4, $y$ is an an integer from 1–5 and $x+y$ does not exceed 5, the molecular proportion of diol being greater than, but not more than twice, the molecular proportion of acid, the viscosity of the polyester at 25° C. being 50–20,000 centistokes, the relative proportions of diester and polyester in the blend being such that the viscosity of the blend at 210° F. is 3–10 centistokes.

7. A lubricating composition according to claim 6 including an anti-oxidizing amount of phenothiazine.

8. A lubricating composition consisting essentially of:

at least one diester selected from the group consisting of di(2-ethyl) sebacate, di(3:5:5-trimethylhexyl) sebacate and 2-ethylhexyl(3:5:5-trimethylhexyl) sebacate, and 5–35% by weight of the composition of a polyester which is soluble in the diester and which has been prepared by reacting an acid of the formula $$HOOCR_1COOH$$

where $R_1$ is an alkylene group having 7–8 carbon atoms, with a diol of the formula $$HO(CH_2CH_2O)_xCH_2C(CH_3)_2CH_2(OCH_2CH_2)_yOH$$

where:

$x$ is an integer from 0–1, $y$ is an integer from 1–2 and $x+y$ equals 1–2, the molecular proportion of the diol being greater than, but not more than twice, the molecular proportion of the acid, the viscosity of the polyester at 25° C. being 500–10,000 centistokes, and the relative proportions of diester and polyester in the blend being such that the viscosity of the blend at 210° F. is 6–10 centistokes.

9. A lubricating composition according to claim 8, in which the acid is one in which $R_1$ is a radical selected from the group consisting of octamethylene, 1:1:3-trimethyltetramethylene and 1:3:3-trimethyltetramethylene.

10. A lubricating composition according to claim 8 including about 1% by weight of the composition of phenothiazine.

References Cited in the file of this patent

UNITED STATES PATENTS

| | | |
|---|---|---|
| 2,499,983 | Beavers | Mar. 7, 1950 |
| 2,499,984 | Beavers et al. | Mar. 7, 1950 |
| 2,820,815 | Matuszak et al. | Jan. 21, 1958 |

FOREIGN PATENTS

| | | |
|---|---|---|
| 763,077 | Great Britain | Dec. 5, 1956 |
| 786,767 | Great Britain | Nov. 27, 1957 |
| 790,923 | Great Britain | Feb. 19, 1958 |

OTHER REFERENCES

"I. and E. Chem.," December 1950, vol. 42, No. 12 page 2415.

"Lubrication Engineering," August 1957, pgs. 454–458.